No. 837,088. PATENTED NOV. 27, 1906.
W. F. MacGREGOR.
BEATER FOR THRESHING MACHINES.
APPLICATION FILED JULY 1, 1905.
2 SHEETS—SHEET 1.
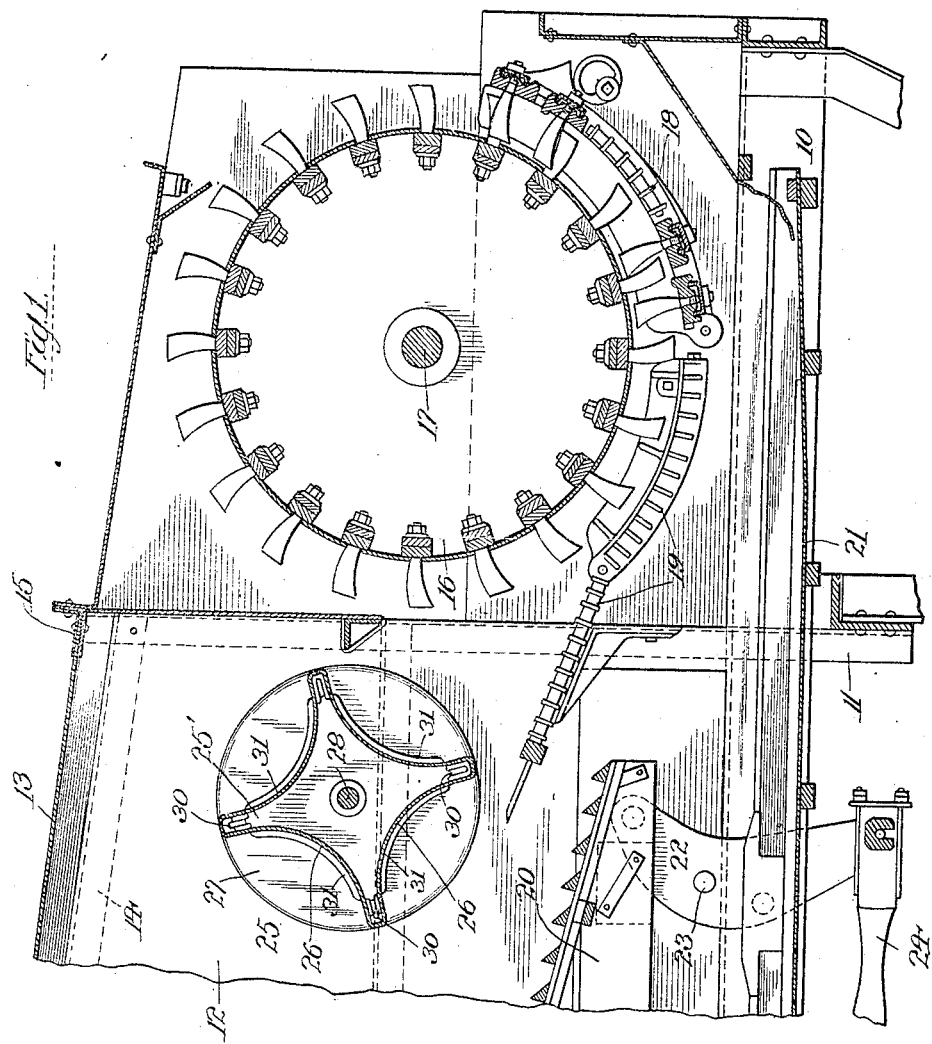
Witnesses:
Inventor:
Wallace F. MacGregor
by Peirce + Fisher
Attorneys No. 837,088. PATENTED NOV. 27, 1906.
W. F. MacGREGOR.
BEATER FOR THRESHING MACHINES.
APPLICATION FILED JULY 1, 1905.
2 SHEETS—SHEET 2.
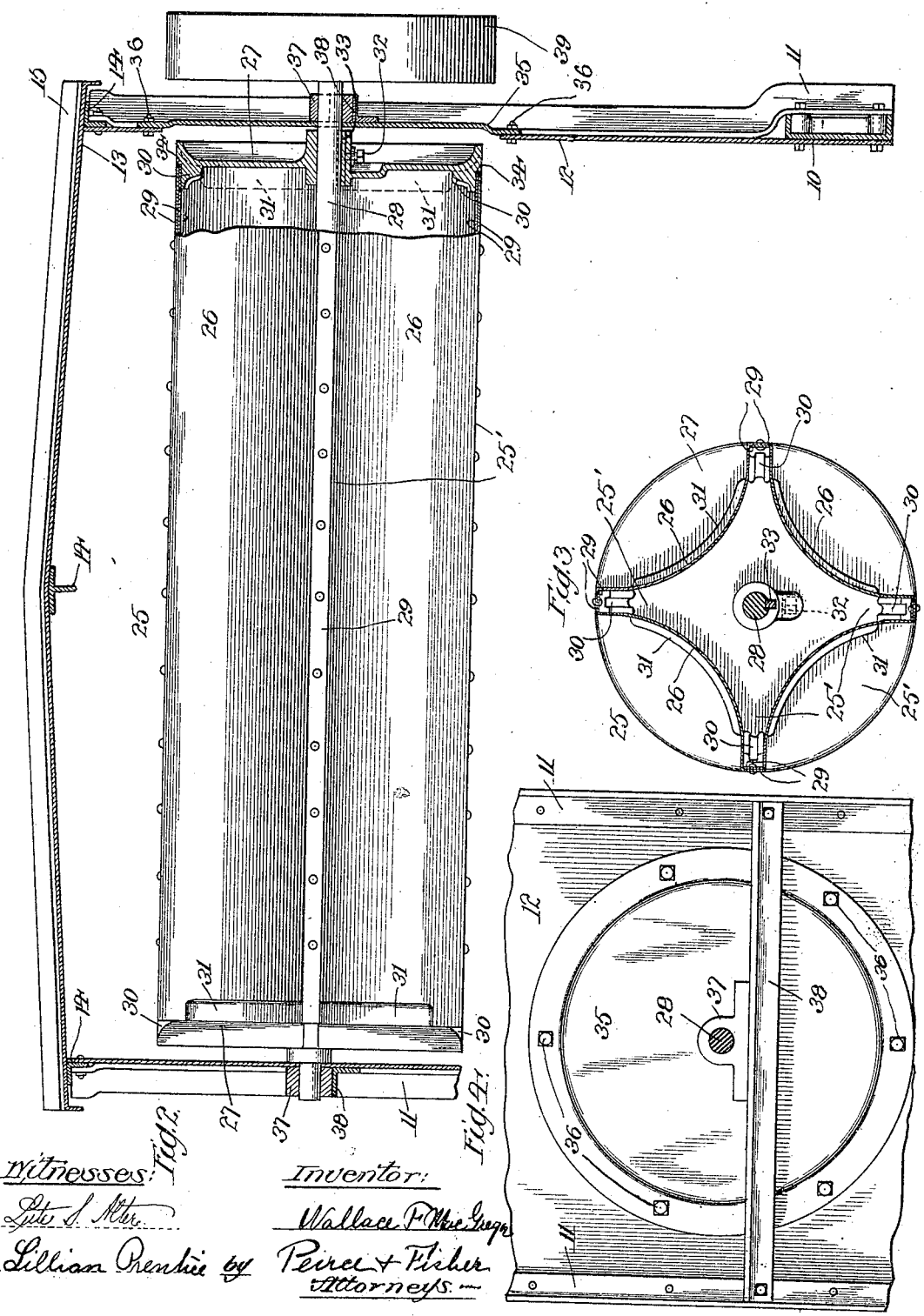

UNITED STATES PATENT OFFICE.

WALLACE F. MacGREGOR, OF RACINE, WISCONSIN, ASSIGNOR TO J. I. CASE THRESHING MACHINE COMPANY, OF RACINE, WISCONSIN, A CORPORATION.

BEATER FOR THRESHING-MACHINES.

No. 837,088.　　　Specification of Letters Patent.　　　Patented Nov. 27, 1906.

Application filed July 1, 1905. Serial No. 267,918.

*To all whom it may concern:*

Be it known that I, WALLACE F. MACGREGOR, a citizen of the United States, and a resident of Racine, county of Racine, and State of Wisconsin, have invented certain new and useful Improvements in Beaters for Threshing-Machines, of which the following is declared to be a full, clear, and exact description.

The invention relates to beaters for threshing-machines and the like, and seeks to provide an improved form of construction which will be light and inexpensive, but which will also be strong and durable and easily repaired.

The invention consists in the features of construction and arrangements of parts hereinafter set forth, illustrated in the accompanying drawings, and more particularly pointed out in the appended claims.

In the drawings, Figure 1 is a section of the forward end of a threshing-machine, illustrating the location of the beater. Fig. 2 is a cross-section through the casing of the threshing-machine with the beater shown partially in elevation and partially in section. Fig. 3 is an enlarged detail cross-section of the beater. Fig. 4 is a partial elevation of the exterior of the thresher-casing, showing the manner of mounting the beater-shaft.

The thresher-casing may be of any suitable or usual form, but, as shown, comprises the sills 10 and uprights 11, which are preferably formed of structural-metal bars and covered with the plate-metal sheathing 12. The deck 13 of the casing is supported by the longitudinal and transverse deck-bars 14 and 15.

The threshing-cylinder 16 is mounted upon a shaft 17 within the forward end of the thresher-casing and above the concaves 18 and grates 19. The straw-rack 20 and grain-conveyer 21 are of any usual or suitable construction and in the form shown are carried by the rock-arm 22 of the cross rock-shaft 23. The straw-rack is pivotally connected to the rock-arm above the shaft, and the conveyer is pivotally connected to the rock-arms below the shaft. The straw rack and conveyer are oscillated in any suitable manner, as by means of a pitman 24, driven from the crank-shaft. (Not shown.) The revolving beater 25 is arranged in rear of the cylinder and above the adjacent ends of the grate and straw-rack. The beater strikes upon the straw as it leaves the threshing-cylinder and drives the grain down through the same. It also insures that the straw will be properly driven onto the straw-rack.

In the construction shown the wings of the beater are formed by concave sheet-metal plates 26, extending transversely between the heads 27, which are fixed to the beater-shaft 28. This form of beater has been found effective inasmuch as the straw cannot readily wind thereon or become entangled with the beater-wings. Heretofore the concave plates 26 have been nailed to wooden cross-strips extending between the heads 27. Such a construction, however, was expensive and not easily repaired. In the present construction the transverse concave plates 26, which are preferably formed of sheet-steel, are provided at their edges with circumferentially-extending lips or flanges 29. These lips or flanges of the plates overlap, as shown, and are securely riveted together, so that the body portion of the beater is, in effect, a hollow pipe having radially-projecting wings 25' formed by the connected concave plates 26.

The circular heads 27 are preferably of cast metal, and their outer faces are preferably concave or dished, as shown. Each head is provided on its inner face and adjacent its periphery with a series of inwardly-projecting lugs 30, which snugly fit within the body portion of the beater and within the ends of the wings thereof. The inner faces of the heads are also provided with inwardly-projecting arc-shaped ribs 31, which engage the outer faces of the concave plates 26 at their ends. The lugs 30 and ribs 31 are preferably cast in piece with the heads, as shown. Set-screws 32 and keys 33 or other suitable means secure the heads to the beater-shaft 28.

In assembling the parts the plates 26 are first riveted together to form the hollow body portion of the beater. The heads are then placed over the ends of the body portion with the lugs 30 thereof fitting within the beater-wings of the body portion and with the ribs 31 extending over the ends of the body portion of the beater and in close contact with the ends of the concave plates, so that the edges of the body portion of the beater abut snugly against the inner faces of the heads 27. The lugs 30, as shown, are provided with shoulder portions 34 in line with the inner face of the head.

The body portion of the beater is not fastened permanently to the heads; but the parts are held in place by fastening the heads to the beater-shaft 28 with the set-screws 32.

The construction of the body portion of the beater is light, but extremely strong and rigid. The lugs 30 of the heads firmly support the wings of the beater and the ribs 31 prevent the buckling of the concave plates 26 under the influence of centrifugal force. Moreover, the beater can be very easily taken apart for repairs, since by simply loosening the set-screws 32 the heads 27 may be slipped from position. The body portion can then be readily taken out and conveniently repaired or a new one put in its place.

For convenience in removing the beater for repairs and the like the sheathing 12 opposite the end of the beater is provided with an opening which is closed by a plate 35, removably held in position by bolts 36. The ends of the beater-shaft 28 are carried in journal-boxes 37, which are supported upon cross angle-bars 38. The angle-bars 38 are detachably bolted to the uprights 11. (See Fig. 4.)

Beater-shaft 28 carries a pulley 39 on its outer end, which may be belted to the power-shaft of the machine in any suitable manner.

It is obvious that numerous changes can be made in the details set forth without departure from the essentials of the invention.

Having described my invention, what I claim as new, and desire to secure by Letters Patent, is—

1. In threshing-machines, the combination of the beater comprising a body portion constructed of concave sheet-metal plates connected to form the beater-wings, heads removably fitting the ends of said body portion having lugs engaging the inner and outer surface thereof at its ends, the beater-shaft, and removable means for positively holding said heads in position on said shaft, substantially as described.

2. In threshing-machines, the combination of the beater comprising a body portion constructed of concave sheet-metal plates connected to form the beater-wings, heads removably fitting the ends of said body portion having lugs extending within the ends of said wings and curved ribs engaging the outer faces of said plates at their ends, the beater-shaft, and means removably securing said heads to said shaft, substantially as described.

3. In threshing-machines, the combination with the beater-shaft, of the beater comprising a body portion formed of concave sheet-metal plates connected at their edges to form the beater-wings, circular heads removably fitting over the ends of said body portion having lugs extending within the ends of said wings and projections engaging the outer faces of said concave plates at their ends, and means for connecting said heads to said beater-shaft, substantially as described.

4. In threshing-machines, the combination with the beater-shaft, of the beater comprising a body portion constructed of concave sheet-metal plates having circumferentially-extending, overlapping edge flanges riveted together to form the beater-wings, cast-metal heads removably fitting over the ends of said body portion, having lugs extending within the end of said wings and curved ribs engaging the outer faces of said concave plates at their ends, and set-screws removably securing said heads to said beater-shaft, substantially as described.

5. A beater for threshing-machines comprising a body portion constructed of concave sheet-metal plates forming the wings of the beater, circular heads removably fitting over the ends of said body portion having lugs engaging the inner and outer surfaces of said body portion at its ends, a shaft and set-screws for positively but removably holding said heads in position on said shaft, substantially as described.

6. A beater for threshing-machines comprising a body portion constructed of concave sheet-metal plates forming the wings of the beater and heads removably fitting the ends of said body portion having lugs extending within the ends of said wings and projections engaging the outer faces of said concave plates at their ends, substantially as described.

7. A beater for threshing-machines comprising a body portion constructed of concave sheet-metal plates connected at their edges to form the beater-wings, and heads extending over the ends of the body portion and having lugs extending within the ends of said wings and curved projecting ribs engaging the outer faces of said concave plates at their ends, substantially as described.

8. A beater for threshing-machines comprising a body portion formed of concave, sheet-metal plates having circumferentially-extending, overlapping edge flanges riveted together and circular heads extending over the ends of said body portion and having lugs projecting within the ends of said wings and projections engaging the outer faces of said concave plates at their ends, substantially as described.

WALLACE F. MacGREGOR.

Witnesses:
 Edwin E. Russell,
 Frederick Lee Norton.